3,417,033
// Patented Dec. 17, 1968

3,417,033
1,4-ENDOXACYCLOHEXANE POLYETHERS AND PROCESS FOR PREPARING THEM
Klaus Weissermel, Frankfurt, and Klaus Kullmar, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Apr. 28, 1964, Ser. No. 363,268
Claims priority, application Germany, May 3, 1963,
F 39,649
1 Claim. (Cl. 260—2)

ABSTRACT OF THE DISCLOSURE

Polyethers of 1,4 endooxacyclohexane and polyethers which are copolymers of 1,4-endooxacyclohexane with other cyclic ethers such as an oxacyclobutane, an oxacyclopentane, and a 1,3,6-trioxacyclooctane are prepared by utilizing a catalyst system of an organo aluminum compound and an organic halogen containing oxygen compound. The halogen of the latter compound has a certain required mobility as measured by solvolysis speed in methanol. Polyethers which fall within the group exhabit a high thermostability as well as dimensional stability at elevated temperatures. These polymers can be used as bearing materials as well as for purposes of forming sheets, films and shaped articles. A representative polyether copolymer is a condensate of 1,4-endoxacyclohexane and 3,3-bis(chloromethyl)-oxacyclobutane.

---

The present invention relates to polyethers and a process for preparing them.

It is known that cyclic ethers can be polymerized by means of metal or non metal halides having the character of Lewis acids, the etherates of which are able to form oxonium salts. 1,4-endooxacyclohexane has been transformed into a polyether according to the aforesaid process; there were obtained, however, compounds having only relatively low molecular weight (5,000–10,000) and, accordingly, low reduced viscosities in the range of from about 0.05–0.2.

The use of Lewis acids as catalysts for the polymerization of cyclic ethers has the drawback that the polymers obtained do not have high molecular weights since Lewis acids simultaneously act as depolymerization catalysts. A further drawback is the appearance of colorations when processing the polymers at elevated temperatures, if traces of the catalyst should have remained in the polymer. It is necessary, therefore, to remove the catalyst quantitatively from the polymer.

Now we have found a process for preparing infusible and/or high-melting polyethers having a high molecular weight wherein 1,4-endoxacyclohexane is polymerized alone or in admixture with other cyclic ethers in the presence of a catalyst system consisting of organoaluminum compounds and oxygen compounds containing halogen. The polyethers of very high molecular weight have an extremely high resistance to heat. It is not necessary to remove the catalyst from the polymer when the reaction is terminated. The polymerization may be carried out in the presence of inert solvents.

The high-molecular weight homopolymers of 1,4-endooxacyclohexane which can be prepared in the aforesaid manner and which have a reduced viscosity within the range of from about 1.0–3.0 are infusible. Coloration and depolymerization only set in at temperatures above 450° C.

The copolymers of 1,4-endoxacyclohexane are distinguished by very high melting points that are in all cases considerably higher than the melting points of the homopolymers prepared from the corresponding co-monomers. There can be used as co-monomers cyclic ethers such as oxacyclobutanes, oxacyclopentanes or 1,3,6-trioxacyclooctanes. The mixing ratio of the co-monomers used is variable in any desired way.

Suitable organoaluminum compounds that may initiate the polymerization according to the present invention in admixture with organic halogenated oxygen compounds are compounds of the general formula

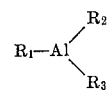

wherein $R_1$ stands for alkyl, $R_2$ represents alkyl, halogen or hydrogen and $R_3$ stands for alkyl, oxalkyl, halogen or hydrogen.

The alkyl radicals may be straight-chain or branched and they preferably contain 1–6 carbon atoms. As halogen there is particularly used chlorine. There may be mentioned for example: trimethyl aluminum, triethyl aluminum, triisobutyl aluminum, diethyl aluminum hydride, diethyl aluminum chloride, ethyl aluminum dichloride, aluminum sesquichloride, and diethyl hydroxyethyl aluminum.

Suitable co-catalysts are oxygen compounds containing halogens, preferably chlorine or fluorine, the halogen of which is less mobile than that of the α-chlorisoproypl ethyl ether. By mobility of the halogen the solvolysis speed in ethanol is to be understood. The halogen atom is preferably in β-position to the oxygen atom. Suitable cocatalysts are, for example:

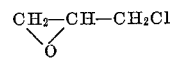

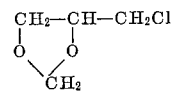

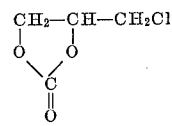

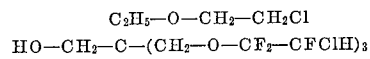

The quantities of the organoaluminum compounds necessary for initiating the polymerization and of the halogen-oxygen compound depend on the monomers and the polymerization conditions chosen. The concentrations may generally vary between 0.01 and 10% by weight, preferably between 0.1 and 4% by weight, calculated on the monomer or the monomer mixture. It is not necessary that the organoaluminum compound and the halogen-oxygen compound are present in equivalent quantities. The quantitative ratio that is favorable in each case depends on the monomers used and must be determined according to circumstances.

Solvents that are appropriated for the polymerization according to the present invention are, for example, aliphatic, cycloaliphatic or halogenated hydrocarbons such as for example, pentane, cyclohexane, toluene or methylene chloride.

The polymerization temperature depends on the monomer of monomers used, on the catalyst mixture chosen and, on the solvent. It may vary within the range of from —20° C. to + 80° C., preferably between 0° C. and +60° C.

Moisture and atmospheric oxygen must be excluded during the polymerization since they strongly influence the catalyst activity.

The homopolymer of 1,4-endooxacyclohexane precipitates under the form of a white fine infusible polymer powder. It colors and depolymerizes at temperatures above 450° C. It is insoluble in most of the organic solvents and readily soluble in phenol. It can be compounded with polyacetals of the type of polyoxymethylene and other thermoplastics and it imparts to these substances a higher thermal stability, a better dimensional stability under heat and a higher abrasion resistance. Such compounds are well appropriated for example as bearing material.

The copolymers prepared according to the present invention are plastics which can be processed in the thermoplastic state; they have an excellent resistance to high temperatures and can be manufactured into sheets, films and shaped articles of all kinds.

The following examples serve to illustrate the invention but they are not intended to limit it thereto:

Example 1

50 parts by weight 1,4-endooxacyclohexane were mixed with 1.5 parts by weight epichlorohydrine. The mixture was heated to 40° C., subsequently 1.5 parts by weight triethyl aluminum was added under nitrogen and the batch was further maintained at 40° C. After a few minutes a milky haze in the previously clear polymerization mixture showed that polymerization set in. After some hours the polymerization batch had polymerized to a large extent. The pulverulent polymer was ground with methanol, boiled for 15 minutes under reflux with methanol, filtered off with suction, washed with methanol and dried in the drying chamber for 5 hours at 15° C. The yield amounted to 30.5 g. of a fine white polymer powder.

The reduced viscosity, measured at 25° C. in a solution of 1% of the polymer in a mixture composed of 21.1% by weight phenol and 78.9% by weight carbon tetrachloride was 1.92.

The polymer was infusible and could not be dissolved in diphenyl ether. It gradually took a yellow coloration above 400° C. in the presence of air and above 450° C. it rapidly blackened and depolymerized.

In a comparison test the polymerization of 1,4-endooxacyclohexane was carried out according to a known process with boron trifluoride and epichlorohydrin as catalysts. In this process the polymerization conditions described above were applied, but there were used instead of 2 parts by weight triethyl aluminum 0.5 part by weight boron trifluoride etherate. The polymer obtained had a melting point of 245° C. and a reduced viscosity (measured under the conditions as described above) of 0.025. It could be dissolved in diphenyl ether.

Example 2

2.0 parts by weight ethyl-β-chloroethyl ether and 2.5 parts by weight diethyl aluminum chloride were introduced under nitrogen into a solution of 50 parts by weight 1,4-endooxacyclohexane in 250 parts by weight methylene chloride at room temperature. 28 parts by weight of a fine white infusible polymer powder separated off in the course of 36 hours. The reduced viscosity measured under the conditions indicated in Example 1 was 1.45.

Example 3

A mixture of 30 parts by weight 1,4-endooxacyclohexane and 30 parts by weight 3,3-bis-(chloromethyl)-oxacyclobutane was polymerized under nitrogen with 2.8 parts by weight epichlorohydrin and 1.8 parts by weight triethyl aluminum at room temperature. In the course of 24 hours so much of a white pulverulent powder was separated off that the batch solidified to form a stiff paste. It was further processed according to the method described in Example 1. There were obtained 41 parts by weight of a white polymer powder which melted into a high-viscous plastic mass at 235° C. The reduced viscosity (measured as described in Example 1) was 0.95. The polymer could be moulded into very tough sheets at temperatures of 280–290° C. It was soluble in warm chloroform, whereas the homopolymers of the 1,4-endooxacyclohexane and of 3,3-bis-(chloromethyl)-oxacyclobutane were insoluble in this solvent.

Example 4

A mixture of 50 parts by weight 1,4-endooxacyclohexane and 50 parts by weight tetrahydrofurane was polymerized at 50° C. under nitrogen with 6 parts by weight 4-chloromethyl-1,3-dioxolane and 1.8 parts by weight triethyl aluminum. After 20 hours the batch had solidified to form a solid transparent polymer block.

Example 5

A mixture of 40 parts by weight 1,4-endooxacyclohexane and 60 parts by weight 1,3,6-trioxacyclooctane was polymerized at 80° C. under nitrogen with 4.3 parts by weight 4-chloromethyl-1,3-dioxolanone-2 and 2.4 parts by weight triethyl aluminum. After 18 hours the batch had solidified to form a solid transparent polymer block. The polymer melted at 220° C. and could be molded into tough elastic sheets at 260° C.

We claim:
1. A high molecular weight polyether of 1,4-endooxacyclohexane being infusible up to 450° C. and of 1,4-endooxacyclohexane with at least one compound selected from the group consisting of an oxacyclobutane, an oxyclopentane and a 1,3,6-trioxacyclooctane prepared by polymerizing at a temperature in the range of —20° to +80° C. said monomers in the presence of a catalyst system comprising (A) at least one organo aluminum compound of the formula

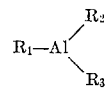

wherein $R_1$ represents alkyl, $R_2$ represents alkyl, halogen or hydrogen and $R_3$ represents alkyl, oxalkyl, halogen or hydrogen, and (B) at least one organic, halogen-containing oxygen compound, the halogen of which is less mobile than that of the α-chloro isopropyl ethyl ether measured as solvolysis speed in methanol, said polyethers having a reduced viscosity within the range from about 1.0 to 3.0.

References Cited

UNITED STATES PATENTS

| 2,764,559 | 9/1956 | Wilkins | 260—2 |
| 2,856,370 | 10/1958 | Muetterties | 260—2 |
| 3,197,420 | 7/1965 | Weissermel et al. | 260—2 |
| 3,210,298 | 10/1965 | Weissermel et al. | 260—2 |
| 3,259,590 | 5/1966 | Weissermel et al. | 260—2 |

WILLIAM H. SHORT, *Primary Examiner.*

L. M. PHYNES, *Assistant Examiner.*

U.S. Cl. X.R.

260—63, 346.1